Dec. 24, 1935.  H. W. RUPPLE  2,025,309
CHUCK MECHANISM FOR AUTOMATIC MACHINE TOOLS
Filed Nov. 18, 1931    5 Sheets-Sheet 1

INVENTOR:
HARRY W. RUPPLE
ATTORNEYS

Dec. 24, 1935.  H. W. RUPPLE  2,025,309
CHUCK MECHANISM FOR AUTOMATIC MACHINE TOOLS
Filed Nov. 18, 1931  5 Sheets-Sheet 4
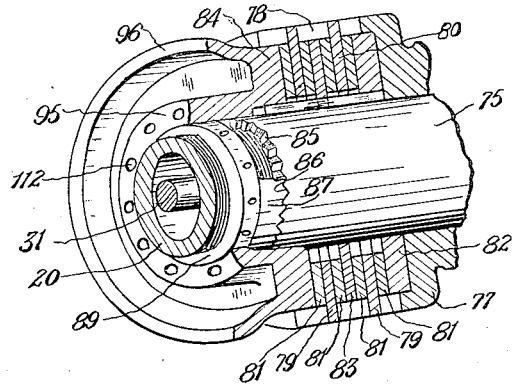
FIG. 4
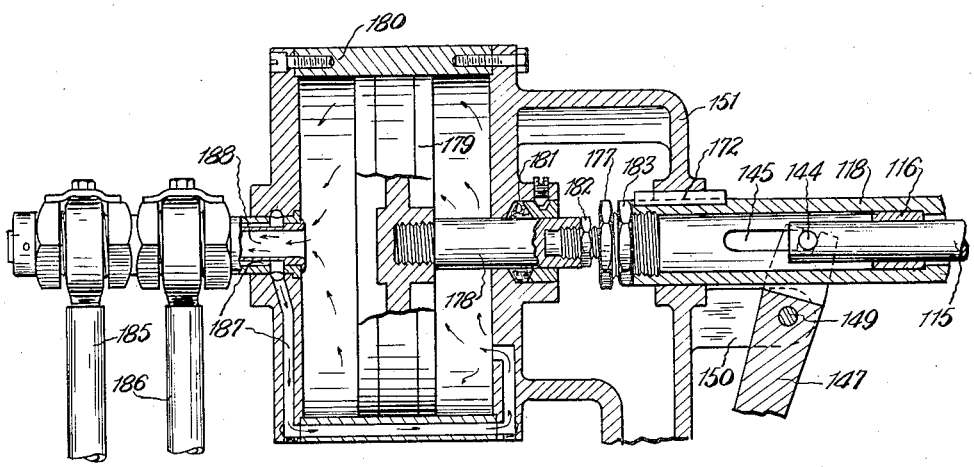
FIG. 5
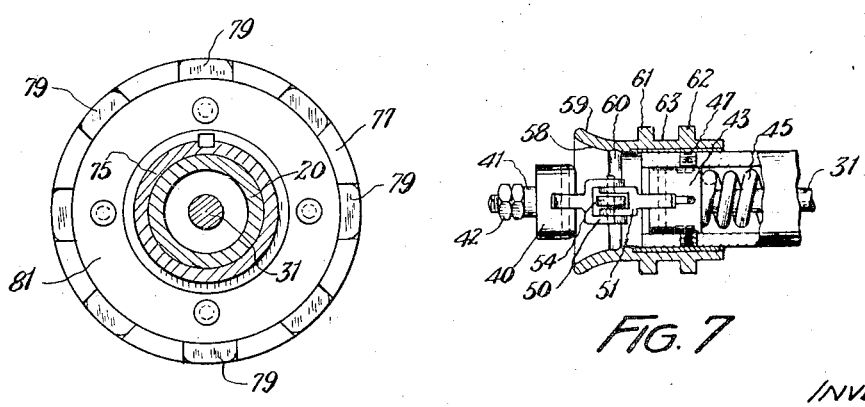
FIG. 6
FIG. 7
INVENTOR:
HARRY W. RUPPLE.
Kwis Hudson & Kent
ATTORNEYS.

Patented Dec. 24, 1935

2,025,309

UNITED STATES PATENT OFFICE 2,025,309

CHUCK MECHANISM FOR AUTOMATIC MACHINE TOOLS

Harry W. Rupple, Shaker Heights, Ohio, assignor to The Cleveland Automatic Machine Company, Cleveland, Ohio, a corporation of Ohio Application November 18, 1931, Serial No. 575,734

28 Claims. (Cl. 29—38)

The present invention relates to metal working machines and more particularly to a multiple spindle indexable type of chucking machine tool. In machines of the type referred to a plurality of rotatable spindles are supported in an indexable spindle turret equally spaced about the axis thereof. The work is supported in chucks carried by the spindles and operated upon by one or a plurality of tools positioned adjacent each spindle. The positions at which the spindles come to rest and the work operated upon by the tools, as the spindle turret is indexed are called stations. The spindle turret is periodically indexed so as to carry the spindles and the work to the various stations, one of which is a loading station, when the finished article is removed from the chuck and a blank inserted. The chucks are usually mechanically operated, either by manual or automatic control means, and the loading may be performed manually or by automatic mechanical loaders.

An object of the present invention is the provision of novel means for driving the spindle and operating the chuck of a machine tool of the type referred to above.

Another object of the invention is the provision of novel means for disconnecting the spindle from the drive, stopping the same, and opening and closing the chuck jaws at the loading station.

Another object of the invention is the provision of novel fluid pressure actuated means for operating the jaws of a chuck supported by a rotatable spindle, which will be simple and economic in construction and reliable in operation.

Another object of the invention is the provision of a novel automatic metal working machine tool provided with mechanism to disconnect the spindles from the drive and stop the same at the loading station, mechanism for operating the chuck jaws, and a fluid pressure operated motor positioned in alignment with the spindle for actuating the chuck operating mechanism which may be either manually or automatically controlled.

Further objects and advantages of the invention will be apparent to those skilled in the art from the following description of the preferred embodiment of the invention described with reference to the accompanying drawings, in which, Fig. 1 is a front elevational view of the spindle end of a metal working machine embodying the present invention.

Fig. 4 is a perspective view with portions broken away, of the clutch assembly shown in elevation in Fig. 1 and in section in Fig. 2.

Fig. 5 is a sectional view taken through the fluid pressure motor shown in Fig. 1.

Fig. 6 is a sectional view taken on the line 6—6 of Fig. 2.

Fig. 7 is a sectional view with portions in elevation taken on the line 7—7 of Fig. 1.

Figure 1:
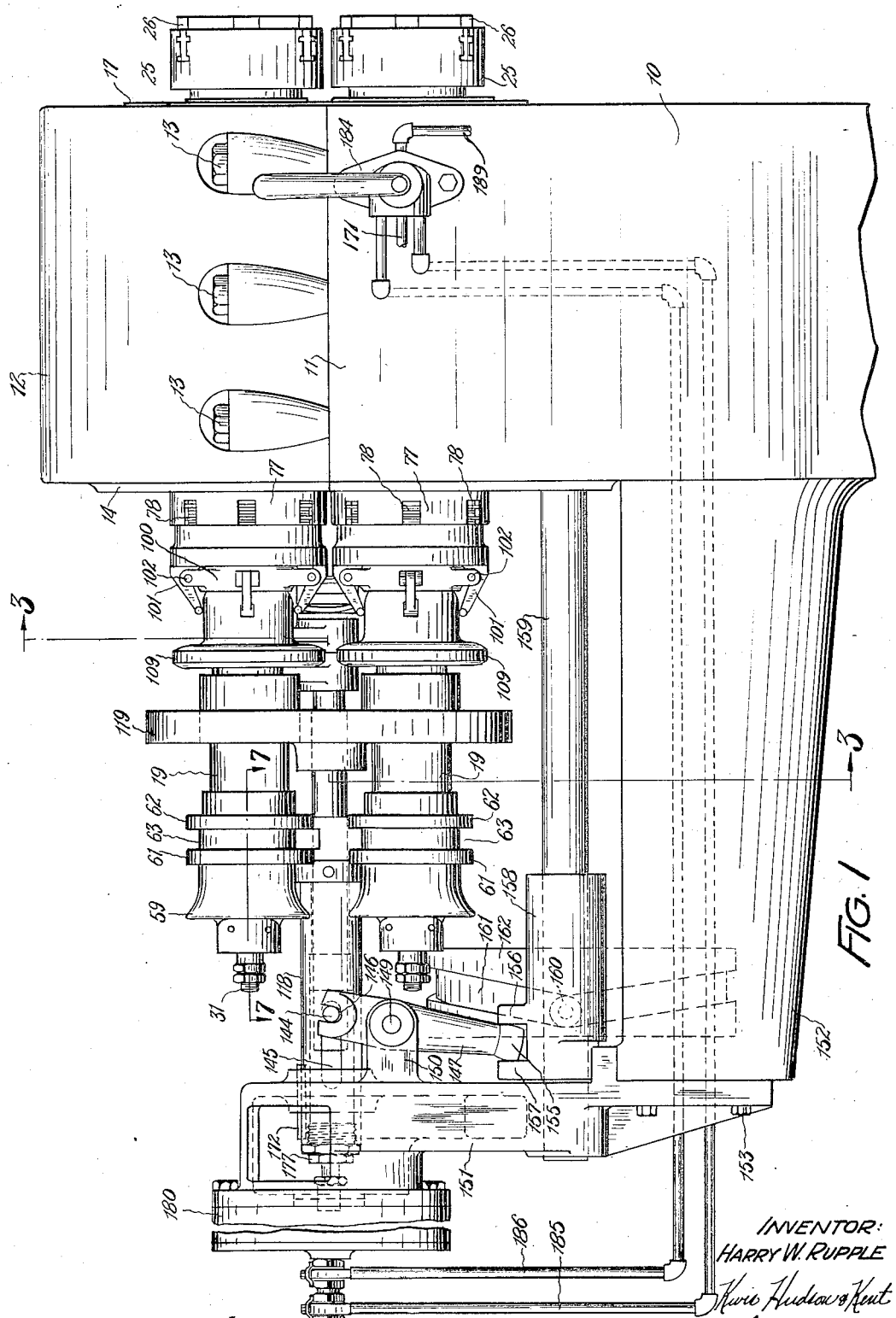

Referring to the drawings, reference character 10 designates the bed of an automatic metal working machine tool, of which the spindle end alone is illustrated. A spindle head 11 carried on one end of the bed 10 rotatably supports in a suitable opening in said head and a cap member 12 detachably secured thereto as by the bolts 13, a spindle turret 14, see Fig. 2, in suitable bearings 15 and 16 formed on the interior of the spindle head 11 and the cap member 12. The spindle turret 14 is held from longitudinal movement in the spindle head 11 by a flange 17 formed on one end thereof and a removable ring 18 secured to the other end thereof in any suitable manner.

A plurality of spindles 19, in the present instance four, are rotatably supported in a plurality of longitudinal apertures in the spindle turret, equally spaced from the axis of said turret and from each other. Each of the spindles 19 is identical in construction and includes a tubular member 20, rotatably supported in tapered bearings 21 and 22 provided with means to take up wear. An anti-friction bearing 23 is provided to take the end thrust of the spindle.

Figure 2:
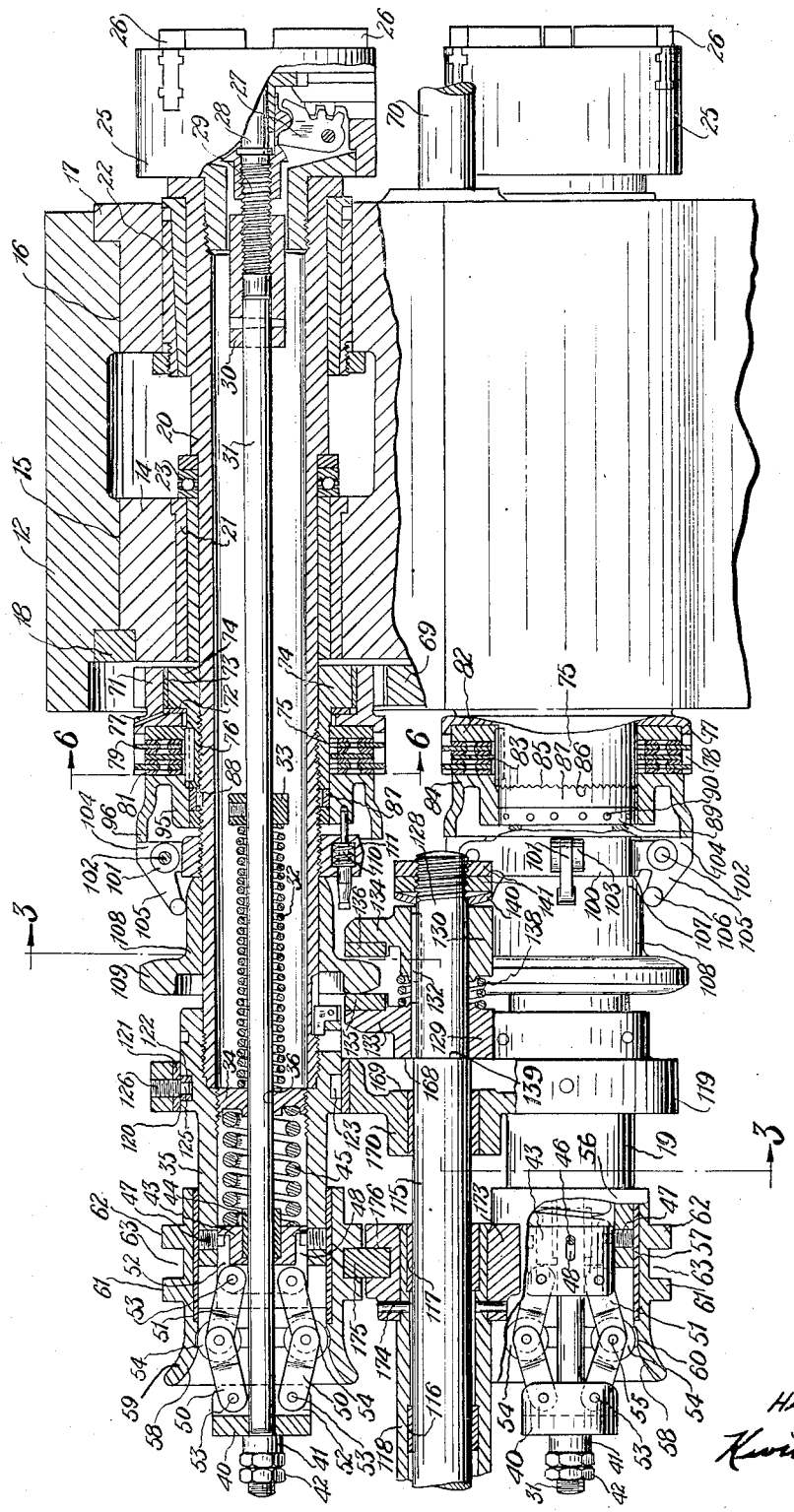
Fig. 2 is a view with portions broken away, taken on the line 2—2 of Fig. 3.

The tubular member 20 carries at the right-hand end thereof, as viewed in Figs. 1 and 2, a chuck 25, the jaws 26 of which are operated by mechanism indicated in general by the reference character 27, as a part 28 thereof is reciprocated longitudinally of the axis of the tubular member 20. A threaded end 29 of the part 28 is threaded into one end of a tubular member 30, the other end of which is fixed to a shaft or rod 31. The shaft 31 projects through the spindle towards the left, as viewed in Figs. 1 and 2, and is continuously urged towards the right, or in a direction to open the jaws 26 of the chuck 25, by a compression spring 32 supported thereon. The spring 32 is compressed between a collar 33 adjustably secured to the shaft 31 and a disk-shaped member 34 threaded into an adapter member 35 which, in turn, is threaded onto the end of the tubular member 20 remote from the chuck 25. The shaft 31 projects through the member 34 and is slidably supported in a suitable opening 36 formed therein.

A cylindrical member 40, the extent of movement of which in one direction is limited by a nut 41 and a jam nut 42 threaded on the shaft 31, is slidably supported on said shaft. A second cylindrical member 43 is slidably supported inside the adapter member 35, on the shaft 31, between the cylindrical member 40 and the disk-shaped member 34. The cylindrical member 43 has a tubular member 44 surrounding the shaft 31 fixed thereto and is continuously urged toward the left, as viewed in Figs. 1, 2 and 7, by a heavy compression spring 45, compressed between said member and disk-shaped member 34. The force exerted by the spring 45 may be adjusted by threading the member 34 in or out along the adapter member 35. Movement of the cylindrical member 43 in either direction is limited by a plurality of pilot pins 46, in the present instance four, formed on the ends of screws 47 threaded in the adapter member 35 and which engage in elongated slots 48 in the cylindrical member 43.

The cylindrical members 40 and 43 each carry a pair of yoke members 50 and 51, respectively, pivotally supported in slots 52 formed therein on pins 53 secured thereto. A pair of rollers 54 are supported on pins 55 carried in the yoke members 50 and 51, see Figs. 2 and 7. A sleeve member 56 slidably supported by a suitable bearing 57 on the exterior of the adapter member 35, has a cam surface 58 formed on a belled end 59 thereof, adapted to engage the rollers 54 as the sleeve member 56 is reciprocated or moved longitudinally of the adapter member 35. A cam groove 60 is formed on the interior of the sleeve member 56 adjacent the cam surface 58 and is engaged by the rollers 54 when the sleeve member 56 is in its extreme left position, as viewed in Figs. 2 and 7, and holds the parts in the relative positions shown. The sleeve member 56 is provided with two flanges 61 and 62 formed integral therewith which cooperate to form an annular groove 63, and is shifted or moved longitudinally over the adapter member 35 by mechanism hereinafter described which engages in the grooves 63. The belled end 59 of the member 56 is spaced from the flange 61 and the member 56 is cylindrical between the bell and the flange and of the same outside diameter as the part between the flanges 61 and 62.

The construction is such that the jaws 26 of the chuck 25 are continuously urged towards their open position, the shaft 31 and the cylindrical member 40 towards the right, and the rollers 54 outwardly by the spring 32. When the sleeve member 56 is moved towards the left, the cam surface 58 forces the rollers 54 inwardly and the cylindrical member 40 together with the shaft 31 to the left to close the chuck jaws. If the work gripped in the jaws 26 is larger than that for which the mechanism is adjusted, the cylindrical member 43 is moved towards the right against the compression of the spring 45.

The spindles 19 are driven by a gear 69 keyed to a shaft 70 extending through the center of the spindle turret 14 and driven from the main drive of the machine in a well known manner. A gear 71, continuously in mesh with gear 69, is rotatably mounted by means of suitable bearings 72 and 73 on an enlarged end 74 of a sleeve member 75. The sleeve member 75 is threaded on threads 76 formed on the tubular member 20 of the spindle 19. The gear 71 has a flange 77 formed integral therewith, and provided with a plurality of slots 78, which receive projection 79 formed on clutch disks 80. The clutch disks 80 have friction surfaces 81, such as cork, fixed thereto as by rivets, and constitute the driving element of a friction clutch, the driven element of which comprises clutch disks 82 and 83 and the member 84 keyed to the sleeve 75.

The threaded engagement of the sleeve 75 with the tubular member 20 permits adjustment of the sleeve longitudinally of said member. To prevent relative movement between the sleeve 75 and the tubular member 20 after these members have been adjusted, the sleeve 75 is formed with projections or teeth 85, adapted to be engaged by similar projections or teeth 86 on a ring 87. The ring 87 is free to slide over the threads 76 and is keyed to the tubular member 20 by a plurality of keys 88. A jam nut 89 provided with holes 90 for a spanner wrench is threaded on the threads 76 and holds the ring 87 in engagement with the sleeve 75.

The member 84, forming part of the friction clutch, is provided with two annular projections 95 and 96. The projection 95 extends over the ring 87 and the jam nut 89 and is slidably supported thereby. A collar member 100 threaded on the threads 76 adjacent the jam nut 89 pivotally supports a plurality of bell crank levers 101 on pins 102 fixed in projecting lugs 103 formed integral with said collar member. The short arm 104 of the bell crank levers 101 engages the projection 96 on the member 84 and compresses the clutch plates as the bell crank levers 101 are moved in one direction about their pivot 102. The other arm 105 of the bell crank levers has a finished head 106 formed on the free end thereof which engages a cam surface 107 on a thimble member 108. The thimble member 108 is slidably mounted on the tubular member 20 and has an annular flange 109 formed integral therewith adapted to be engaged by mechanism hereinafter described for moving the thimble member 108 longitudinally of the sleeve 20. The threaded engagement between the collar member 100 and the tubular member 20 permits adjustment of the collar member longitudinally of the tubular member. The collar member 100 is held in any adjusted position by a spring plunger 110, carried in a boss 111 formed integral with said collar member and adapted to be projected in any one of a plurality of holes 112 formed in the end of the annular projection 95 on the member 84.

The construction of the mechanism just described is such that longitudinal movement of the thimble member 108 along the tubular member 20 moves the bell crank levers 101 about their pivot 102 to engage or release the clutch plates, connecting or disconnecting the spindle with the drive depending upon the direction of movement of the thimble member.

A short shaft 115 is slidably supported at one end in suitable bearings 116 and 117 fixed in the interior of a tubular member 118 and at the other end in a disk member 119. The disk member 119 is supported on the spindles 19 and is provided with a plurality of openings 120 through which the spindles project. The spindles 19 rotate in suitable bearings 121 in the disk member 119 and longitudinal movement of the disk member 119 relative to the spindles is prevented by circular-shaped shoes 122 engaging in grooves 123 in the adapter members 35 of the spindles 19. The shoes 122 are provided with openings 124 in which pilots 125 formed on the ends of screws 126 threaded in the disk member 119 project.

The shaft 115 has a reduced portion 128 on the end thereof adjacent the spindle turret 14. A pair of collar members 129 and 130 are slidably supported on this reduced portion 128 of the shaft 115 and non-rotatably keyed thereto as by the key 132. The collar members 129 and 130 have projections 133 and 134, respectively, formed on one side thereof which carry shoe members 135 and 136 secured thereto in any suitable manner and adapted to engage opposite sides of the annular flange 109 on the thimble member 108 of the spindle 19 in the upper front station.

The collar members 129 and 130 are continuously urged away from each other by a compression spring 138 mounted on the reduced portion 128 of the shaft 115, between said collar members. The spring 138 resiliently holds the collar member 129 in engagement with a shoulder 139 formed by the reduced portion 128 and the collar member 130 in engagement with a spring washer 140 carried on the reduced portion 128 and adjustable therealong by a pair of nuts 141 threaded on the end thereof.

The shaft 115 carries, adjacent the left-hand end thereof, as viewed in Fig. 1, a horizontal pin 144 fixed thereto and projecting to either side through elongated slots 145 in the tubular member 118. The pin 144 is engaged in slots 146 formed in the upper ends of a yoke-shaped lever 147 pivotally mounted on a pin 149 between a pair of projections 150, formed integral with a bracket 151 secured to a horn 152 of the bed 10 by bolts 153. The lower end of lever 147 is formed with a finished head 155 adapted to engage in a slot formed by projections 156 and 157 on a member 158. The member 158 is slidably supported on a pair of rods 159, supported above the horn 152 at one end in the bracket 151, and at the other end in the spindle head 11. The member 158 is reciprocated on the rods 159 by the engagement of a cam roller 160 carried by said member in a cam track 161 formed on a cam drum 162 carried on a cam shaft 163 of the machine. The cam shaft 163 is supported in a boss 165 formed on the rear of the spindle head 11 and by a bracket 166 secured to the rear of the horn 152, as by the bolts 167.

Figure 3:
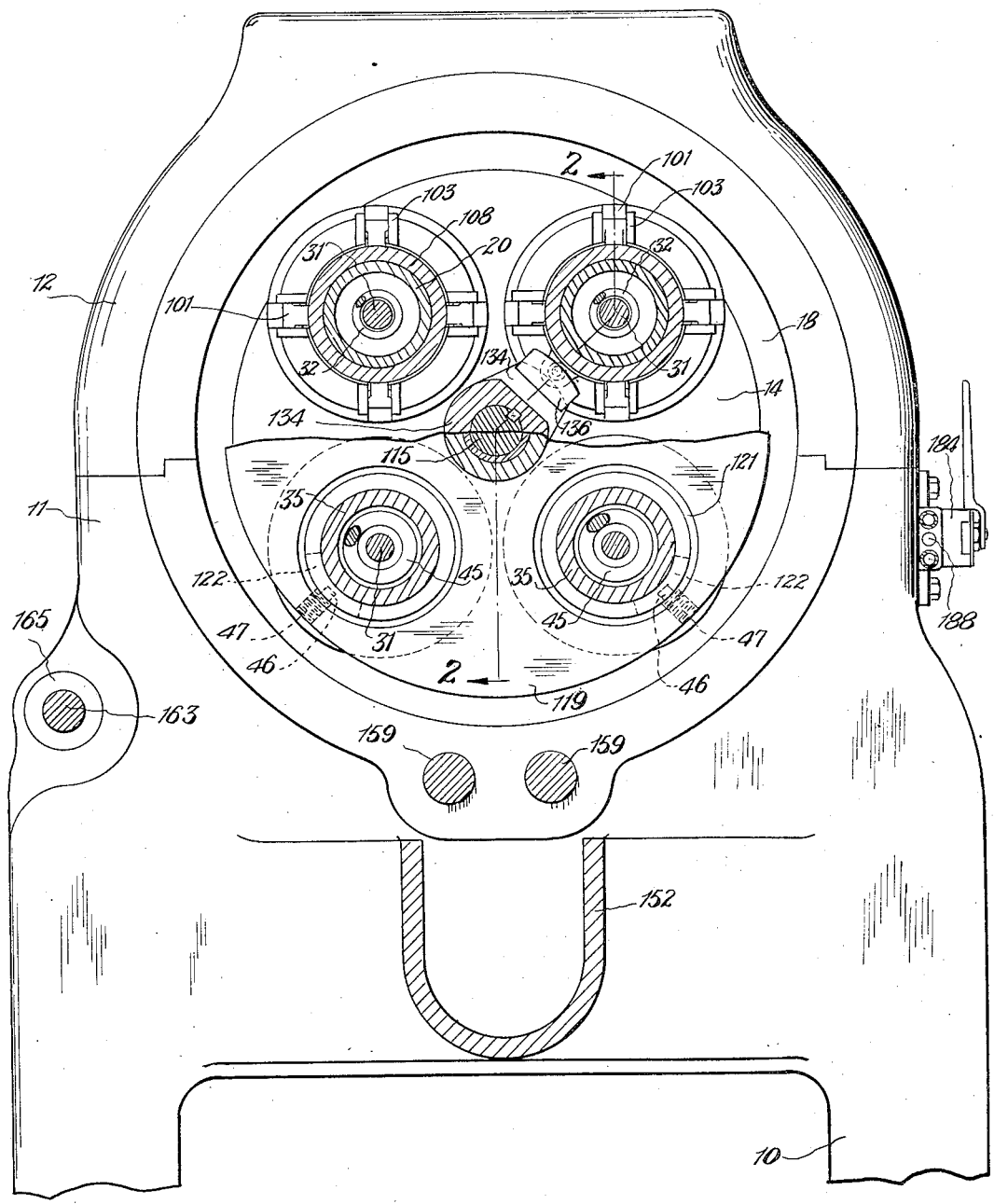
Fig. 3 is a sectional view taken on line 3—3 of Fig. 2.

As the member 158 is reciprocated along the rods 159 in timed relation to the other operations of the machine by cam drum 162, the shaft 115, together with the shoe members 135 and 136, are moved to shift the thimble member 118 to engage and release the clutch. After the clutch has been released by the movement of the shaft 115 towards the left, as viewed in Fig. 2, continued movement of the shaft 115 engages a finished face 168 on the collar member 129, with a finished face 169 on the hub 170 of the disk member 119. The engagement of the face 168 with the face 169 interrupts the movement of the collar member 129, and continued movement of the collar member 130 clamps the annular flange 109 on the thimble member 108 between the shoes 135 and 136, stopping the rotation of the spindle. The projections 133 and 134 and the shoe members 135 and 136 project at an angle from the collar members 129 and 130, see Fig. 3, and are so constructed that they engage only the annular flange 109 on the spindle in the upper front or loading station.

The tubular member 118 is slidably keyed, as by a key 172, in the upper part of bracket 151, and carries a collar member 173 fixed thereto as by the pins 174, see Fig. 2. A shoe 175 adapted to engage in the groove 63 of the sleeve member 56 of the spindle positioned in the upper front or feeding station is fixed in a groove 176 formed in the collar member 173. The other end of the tubular member 118 is connected by an adjusting screw 177 and a connecting rod 178 to a piston 179 of a fluid pressure motor 180. To prevent the escape of fluid about the connecting rod 178, packing 181 is provided. The screw 177 is provided with right and left hand threads on opposite ends thereof. The parts are held in any adjusted positon by jam nuts 182 and 183.

The fluid pressure motor 180 illustrated is a compressed air motor, but other means may be employed, such as a hydraulic motor, etc. The piston 179 is reciprocated by the application of fluid pressure, first to one side thereof, and then to the other, in a well-known manner. The flow of fluid to the motor 180 is controlled by a manually operated valve 184, see Fig. 1, connected to opposite sides of the piston by tubes 185 and 186 and passages 187 and 188, respectively, communicating with said tubes and opposite sides of said piston. When one of the tubes 185 or 186 is connected by the valve 184 with a supply line 189, the other tube is connected to an exhaust line 171.

Figure 8:
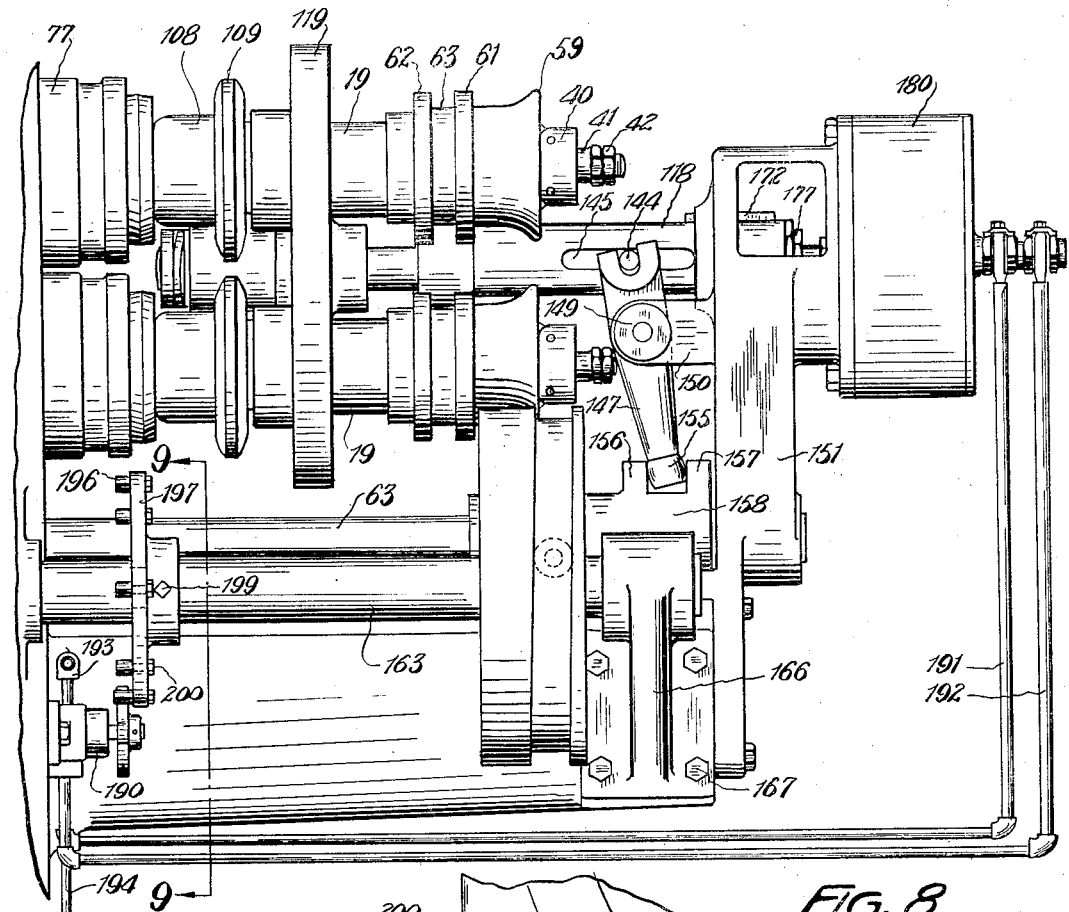
Fig. 8 is a rear elevational view showing a modified construction of the valve means shown in Fig. 1.
Figure 9:
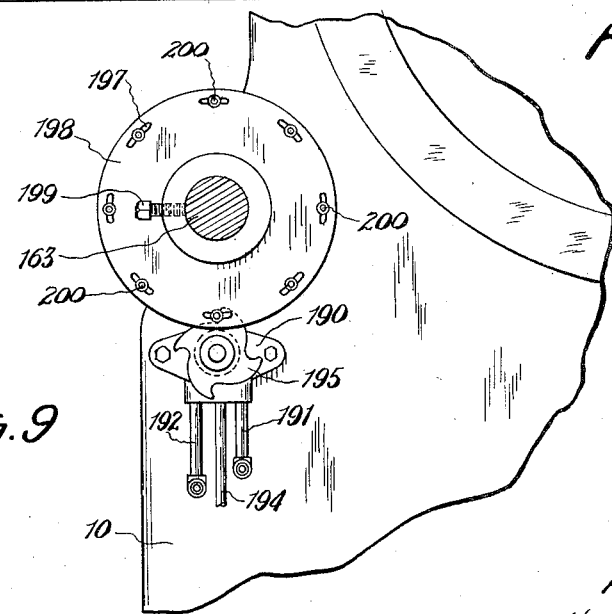
Fig. 9 is a view of the valve operating means taken on the line 9—9 of Fig. 8.

A modification of the manual means for controlling the supply of fluid pressure to the motor 180, illustrated in the preferred embodiment of the invention, is shown in Figs. 8 and 9, which illustrate an automatic means for controlling the supply of fluid pressure to the motor 180. A rotary valve 190 connected to the motor 180 by tubes 191 and 192, a supply line 193 and an exhaust line 194, in a manner similar to the valve 184, is supported on the rear of the bed 10 directly beneath the cam shaft 163. The valve 190 carries a star wheel 195, rotation of which is adapted to connect the tubes 191 and 192 alternately with the supply line 193 and the exhaust line 194. The star wheel 195 is rotated at predetermined intervals in timed relation to the other operations of the machine by a plurality of pins 196 adjustably carried in slots 197 formed in a disk member 198 mounted on the cam shaft 163 and secured thereto by a set screw 199. The pins 196 are fixed to the member 198 by screws 200 and are adjustable in the slots 197 so that the interval between reciprocation of the piston 179 of the motor 180 may be varied as desired.

The operation of the machine is as follows: The spindle turret 14 is indexed to move the spindles 19 from station to station in a well known manner. As a spindle is indexed into the upper front or feeding station, the annular flange 109 on the thimble member 108 carried by the spindle is positioned between the shoes 135 and 136, after which the shaft 115 is moved towards the left, as viewed in Fig. 2, under the operation of the cam drum 162 and the mechanism connected thereto, to operate the clutch and disconnect the spindle from the drive and apply the brake to bring the spindle quickly to rest. After the spindle is brought to rest the valve 184 is operated to release the chuck, the finished work is then removed, a new blank inserted, and the valve operated to again close the chuck. In the modification shown in Figs. 8 and 9, the valve 190 is automatically operated by one of the pins 196 to release the chuck after the spindle has come to rest, and after a predetermined time interval, during which the finished work is removed and a new blank inserted, automatically closed by the following pin 196.

When the chucks are opened the member 56 is shifted to the right, as viewed in Fig. 2, until the flange 61 is to the right of shoe 175 in its normal position, and the clearance between the bell end 59 and the flange 61 permits the machine to be indexed with any or all of the chucks open without damage thereto.

During the loading operation the other spindles continue to rotate unaffected by the clutch operating and chuck actuating mechanism connected to the spindles in the loading station, and the work held in the chucks carried by these spindles is operated upon by the tool at the respective stations. While the invention is illustrated as applied to a four spindle machine, any number of spindles may be employed and the loading station may be any one of the stations.

The preferred embodiments of the invention have been illustrated and described, and I do not wish to be limited to the particular construction shown, which may be varied within the scope of this invention, and I particularly point out and claim as my invention:

1. In a machine of the character described, the combination of a frame, a spindle turret rotatably supported by said frame and adapted to be indexed through a plurality of stations, a plurality of spindles rotatably supported in said turret, chucks carried by said spindles, means for driving said spindles, clutches carried by said spindles adapted to connect and disconnect the same with said driving means, brakes adapted to be applied to said spindles upon their disengagement with said driving means, means for automatically operating said clutch and applying said brake at one of said stations, a fluid pressure operated motor supported on said frame in axial alignment with said turret, means for operatively connecting said motor to said chucks at one of said stations, and means for automatically controlling the flow of fluid to said motor, whereby said chucks are operated in predetermined timed relation to the operation of said clutches.

2. In a machine of the character described, the combination of a frame, a tubular member rotatably supported in said frame, a chuck carried by said tubular member, means slidably supported in said tubular member and adapted to open and close said chuck, toggle means operatively connecting said means and said tubular member, a roller carried by said toggle means, a cam member slidably supported on said tubular member and adapted to engage said roller to operate said toggle means, a groove in the cam surface of said cam member in which said roller engages to lock the parts in a predetermined position, and means for moving said cam member.

3. In a machine of the character described, the combination of a frame, a spindle rotatably supported by said frame, a chuck carried by said spindle, a rod slidably supported in said spindle adapted to open and close said chuck, a member pivotally supported by said spindle, a member pivotally supported by said rod and connected to said member, means supported by said members adapted to be moved transversely of the axis of said spindle to actuate said rod, means supported by said spindle for operating said means, fluid pressure actuated motor supported by said frame, and means for connecting said fluid pressure motor to said last mentioned means.

4. In a machine of the character described the combination of a frame, an indexable spindle turret supported on said frame, a spindle rotatably supported by said turret, means for indexing said spindle turret at predetermined timed intervals whereby said spindles are indexed through a plurality of tool stations, a chuck carried by said spindle, a member slidably supported in said spindle and adapted to open and close said chuck, means connected to said member and said chuck for operating said member, a member slidably supported on said chuck and adapted to operate said means, and fluid pressure means on said frame in axial alignment with said turret adapted to be operatively connected to said last mentioned means at one of said stations.

5. In a machine of the character described the combination of a frame, an indexable spindle turret supported by said frame, a spindle rotatably supported by said turret, means for indexing said turret whereby said spindle is indexed through a plurality of tool stations, a chuck carried by said spindle, a member slidably supported in said spindle and adapted to open and close said chuck, a second member slidably supported by said spindle, means for continuously urging said second member in one direction, toggle means connected to said members, means for moving said toggle means to move said members apart, fluid pressure actuated means adapted to be connected to said last mentioned means at one of said stations, and means for controlling the flow of fluid to said fluid pressure actuated means in predetermined timed relation to the indexing of said turret.

6. In a machine of the character described, the combination of a frame, an indexable spindle turret supported by said frame, a plurality of spindles rotatably supported by said turret, chucks carried by said spindles, means for driving said spindles, clutch means carried by said spindles adapted to connect and disconnect said driving means with said spindles, brakes adapted to be applied to said spindles upon disengagement from said driving means, means supported by said spindles for actuating said clutch and applying said brake, means supported by said spindles for actuating said chucks, fluid pressure operated means adapted to be connected to one of said last two mentioned means, and means for successively connecting said fluid pressure means to a plurality of said means.

7. In a machine of the character described, the combination of a frame, a spindle turret rotatably supported by said frame and adapted to be indexed through a plurality of stations, a plurality of spindles rotatably supported in said spindle turret, movable members supported by said spindles, a fluid pressure operated motor supported in axial alignment with said turret, and means adapted to operatively connect said fluid pressure motor with said movable members at one of said stations.

8. In a machine of the character described, the combination of a frame, a spindle turret rotatably supported by said frame, a plurality of spindles rotatably supported in said spindle turret, means for indexing said spindle turret through a plurality of stations, driving means for said spindles, means for connecting said driving means to said spindles, chucks carried by said spindles, means for operating said chucks, a fluid pressure operated motor, means for connecting said fluid pressure operated motor to one of said means at one of said stations, and means for operating the other of said means at said station.

9. In a machine of the character described, the combination of a frame, an indexable turret rotatably supported by said frame, a plurality of chucks supported by said turret, means for indexing said turret at predetermined intervals whereby said chucks are indexed through a plurality of tool stations, a plurality of members supported by said turret for actuating said chucks, means for operatively connecting said members and chucks, a fluid pressure actuated motor in alignment with said turret, and means in alignment with said turret for operatively connecting said fluid pressure motor successively to said members in one of said stations.

10. In a machine of the character described, the combination of a frame, an indexable turret rotatably supported by said frame, a plurality of chucks supported by said turret equally spaced about the axis thereof, means for automatically indexing said turret at predetermined intervals whereby said chucks are indexed through a plurality of tool stations, a plurality of members supported by said turret and indexable therewith for operating said chucks, a fluid pressure actuated motor comprising a piston in axial alignment with said turret, and means in axial alignment with said turret for directly connecting said piston successively to said members in one of said stations.

11. In a machine of the character described, the combination of a frame, an indexable turret rotatably supported by said frame, a plurality of chucks supported by said turret equally spaced about the axis thereof, means for automatically indexing said turret at predetermined intervals whereby said chucks are indexed through a plurality of tool stations, a plurality of members supported by said turret and indexable therewith for operating said chucks, a fluid pressure actuated motor comprising a piston supported in alignment with said turret, means in axial alignment with said turret for connecting said piston successively to said members in one of said stations, and means for automatically controlling the flow of fluid to said fluid pressure actuated motor whereby said motor is actuated in predetermined timed relation to the indexing of said turret.

12. In a machine of the character described, the combination of a frame, an indexable spindle turret rotatably supported by said frame, a plurality of spindles rotatably supported by said spindle turret and equally spaced about the axis thereof, means for rotating said spindles, means for automatically indexing said spindle turret at predetermined intervals whereby said spindles are indexed through a plurality of tool stations, a plurality of members one of which is movably supported by each of said spindles, and means within the orbit of said spindles for successively actuating said members at one of said stations.

13. In a machine of the character described, the combination of a frame, an indexable spindle turret rotatably supported by said frame, a plurality of spindles rotatably supported by said spindle turret and equally spaced about the axis thereof, means for rotating said spindles, means for automatically indexing said spindle turret at predetermined intervals whereby said spindles are indexed through a plurality of tool stations, a plurality of members one of which is movably supported by each of said spindles, and means within the orbit of said spindles and in axial alignment with said turret for successively actuating said members at one of said stations.

14. In a machine of the character described, the combination of a frame, an indexable spindle turret rotatably supported by said frame, a plurality of spindles rotatably supported by said spindle turret and equally spaced about the axis thereof, means for rotating said spindles, means for automatically indexing said spindle turret at predetermined intervals whereby said spindles are indexed through a plurality of tool stations, a plurality of members one of which is movably supported by each of said spindles, a fluid pressure actuated motor supported by said frame, and means in alignment with said turret for operatively connecting said fluid pressure motor successively to said members in one of said stations.

15. In a machine of the character described, the combination of a frame, an indexable spindle turret rotatably supported by said frame, a plurality of spindles rotatably supported by said spindle turret and equally spaced about the axis thereof, means for rotating said spindles, means for automatically indexing said spindle turret at predetermined intervals whereby said spindles are indexed through a plurality of tool stations, a plurality of members one of which is movably supported by each of said spindles, a fluid pressure actuated motor supported in alignment with said turret, said fluid pressure actuated motor comprising a piston, and means for directly connecting said piston successively to said members in one of said stations.

16. In a machine of the character described, the combination of a frame, an indexable spindle turret rotatably supported by said frame, a plurality of spindles rotatably supported by said spindle turret and equally spaced about the axis thereof, means for rotating said spindles, means for automatically indexing said spindle turret at predetermined intervals whereby said spindles are indexed through a plurality of tool stations, a plurality of members one of which is movably supported by each of said spindles, a fluid pressure actuated motor comprising a piston supported by said frame in axial alignment with said turret, means in axial alignment with said turret for directly connecting said piston successively to said members at one of said stations, and means for automatically controlling the flow of fluid to said fluid pressure actuated motor whereby said piston is operated in predetermined timed relation to the indexing of said turret.

17. In a machine of the character described, the combination of a frame, an indexable spindle turret rotatably supported by said frame, a plurality of spindles rotatably supported by said spindle turret, means for rotating said spindles, means for automatically indexing said spindle turret at predetermined intervals whereby said spindles are indexed through a plurality of tool stations, a plurality of chucks, one of which is supported by each of said spindles, a plurality of members supported by said spindles and operatively connected to said chucks for controlling the operation thereof, and means within the orbit of said spindles for successively actuating said members at one of said stations.

18. In a machine of the character described, the combination of a frame, an indexable spindle turret rotatably supported by said frame, a plurality of spindles rotatably supported by said spindle turret, means for rotating said spindles, means for automatically indexing said spindle turret at predetermined intervals whereby said spindles are indexed through a plurality of tool stations, a plurality of chucks, one of which is supported by each of said spindles, a plurality of members supported by said spindles and operatively connected to said chucks for controlling the operation thereof, and means within the orbit of said spindles and in axial alignment with said turret for successively actuating said members at one of said stations.

19. In a machine of the character described, the combination of a frame, an indexable spindle turret rotatably supported by said frame, a plurality of spindles rotatably supported by said spindle turret, means for rotating said spindles, means for automatically indexing said spindle turret at predetermined intervals whereby said spindles are indexed through a plurality of tool stations, a plurality of chucks, one of which is supported by each of said spindles, a plurality of members supported by said spindles and operatively connected to said chucks for controlling the operation thereof, a fluid pressure actuated motor supported in alignment with said turret, and means in alignment with said turret for operatively connecting said fluid pressure motor successively to said members in one of said stations.

20. In a machine of the character described, the combination of a frame, an indexable spindle turret rotatably supported by said frame, a plurality of spindles rotatably supported by said spindle turret, means for rotating said spindles, means for automatically indexing said spindle turret at predetermined intervals whereby said spindles are indexed through a plurality of tool stations, a plurality of chucks, one of which is supported by each of said spindles, a plurality of members supported by said spindles and operatively connected to said chucks for controlling the operation thereof, a fluid pressure actuated motor supported by said frame and comprising a piston, means for directly connecting said piston successively to said members at one of said stations, and means for controlling the flow of fluid to said fluid pressure actuated motor whereby said last mentioned means is operated in predetermined timed relation to the indexing of said turret.

21. In a machine of the character described, the combination of a frame, an indexable spindle turret rotatably supported by said frame, a plurality of spindles rotatably supported by said spindle turret, means for rotating said spindles, means for automatically indexing said spindle turret at predetermined intervals whereby said spindles are indexed through a plurality of tool stations, a plurality of chucks, one of which is supported by each of said spindles, a plurality of members supported by said spindles and operatively connected to said chucks for controlling the operation thereof, a fluid pressure actuated motor comprising a piston supported in axial alignment with said turret, means in axial alignment with said turret for directly connecting said piston successively to said members in one of said stations, and means for automatically controlling the flow of fluid to said fluid pressure actuated motor in predetermined timed relation to the indexing of said turret.

22. In a machine of the character described, the combination with a frame, an indexable spindle turret rotatably supported by said frame, a plurality of spindles rotatably supported by said spindle turret, means for automatically indexing said spindle turret at predetermined intervals whereby said spindles are indexed through a plurality of tool stations, means for driving said spindles, a plurality of chucks supported by said spindles, means supported by said spindles for controlling the operation of said chucks, means supported by said spindles for connecting and disconnecting the means for driving said spindles, and means in alignment with said turret for successively actuating one of said last two mentioned means at one of said stations.

23. In a machine of the character described, the combination with a frame, an indexable spindle turret rotatably supported by said frame, a plurality of spindles rotatably supported by said spindle turret, means for automatically indexing said spindle turret at predetermined intervals whereby said spindles are indexed through a plurality of tool stations, means for driving said spindles, a plurality of chucks supported by said spindles, means supported by said spindles for controlling the operation of said chucks, means supported by said spindles for connecting and disconnecting the means for driving said spindles, and means in axial alignment with said turret for successively actuating one of said last two mentioned means at one of said stations.

24. In a machine of the character described, the combination with a frame, an indexable spindle turret rotatably supported by said frame, a plurality of spindles rotatably supported by said spindle turret, means for automatically indexing said spindle turret at predetermined intervals whereby said spindles are indexed through a plurality of tool stations, means for driving said spindles, a plurality of chucks supported by said spindles, means supported by said spindles for controlling the operation of said chucks, means supported by said spindles for connecting and disconnecting the means for driving said spindles, a fluid pressure actuated motor supported by said frame, and means in alignment with said turret for operatively connecting said fluid pressure actuated motor successively to one of said last two mentioned means at one of said stations.

25. In a machine of the character described, the combination with a frame, an indexable spindle turret rotatably supported by said frame, a plurality of spindles rotatably supported by said spindle turret, means for automatically indexing said spindle turret at predetermined intervals whereby said spindles are indexed through a plurality of tool stations, means for driving said spindles, a plurality of chucks supported by said spindles, means supported by said spindles for controlling the operation of said chucks, means supported by said spindles for connecting and disconnecting the means for driving said spindles, a fluid pressure actuated motor supported in alignment with said turret and comprising a piston, means in alignment with said turret for directly connecting said piston successively to one of said last two mentioned means at one of said stations, and means for automatically controlling the flow of fluid to said fluid pressure actuated motor whereby said piston is operated in predetermined timed relation to the indexing of said turret.

26. In a machine of the character described, the combination with a frame, an indexable spindle turret rotatably supported by said frame, a plurality of spindles rotatably supported by said spindle turret, means for automatically indexing said spindle turret at predetermined intervals whereby said spindles are indexed through a plurality of tool stations, means for driving said spindles, a plurality of chucks supported by said spindles, means supported by said spindles for controlling the operation of said chucks, means supported by said spindles for connecting and disconnecting the means for driving said spindles, a fluid pressure actuated motor comprising a piston supported in axial alignment with said turret, means in axial alignment with said turret for directly connecting said piston successively to one of said last two mentioned means at one of said stations, and means for automatically controlling the flow of fluid to said fluid pressure actuated motor in predetermined timed relation to the indexing of said turret.

27. In a machine of the character referred to the combination of a frame, an indexable spindle turret rotatably supported by said frame, a plurality of spindles rotatably supported by said turret, chucks carried by said spindles, means for indexing said turret whereby said chucks are indexed through a plurality of tool stations, fluid pressure actuated means for operating said chucks, and a manual valve attached to said frame for controlling the flow of fluid to and from said fluid actuated means.

28. In a machine of the character referred to the combination of a frame, an indexable spindle turret rotatably supported by said frame, a plurality of spindles rotatably supported by said turret, chucks carried by said spindles, means for indexing said turret whereby said chucks are indexed through a plurality of tool stations, a double acting fluid actuated motor for operating said chucks, and a manual valve attached to said frame for reversing the direction of flow of fluid to and from said fluid actuated motor for opening and closing the chucks at one of the stations.

HARRY W. RUPPLE.